(12) United States Patent
Wiese

(10) Patent No.: US 8,046,715 B2
(45) Date of Patent: *Oct. 25, 2011

(54) REAL ESTATE VALUE MAP COMPUTER SYSTEM

(75) Inventor: Steven Paul Wiese, Farmington, MI (US)

(73) Assignee: Vepse Technology Co., L.L.C., Wilmington, DE (US)

( * ) Notice: Subject to any disclaimer, the term of this patent is extended or adjusted under 35 U.S.C. 154(b) by 1787 days.

This patent is subject to a terminal disclaimer.

(21) Appl. No.: 10/044,583

(22) Filed: Nov. 9, 2001

(65) Prior Publication Data

US 2002/0077936 A1 Jun. 20, 2002

Related U.S. Application Data

(63) Continuation-in-part of application No. 09/286,922, filed on Apr. 6, 1999, now Pat. No. 6,323,885.

(60) Provisional application No. 60/100,831, filed on Sep. 18, 1998.

(51) Int. Cl.
*G06F 3/048* (2006.01)
*G06F 3/00* (2006.01)

(52) U.S. Cl. ......... 715/835; 715/762; 715/763; 345/619

(58) Field of Classification Search ............... 345/764, 345/962, 961, 835, 839, 846, 810, 825, 771, 345/826; 340/990, 995; 705/1, 27, 8, 26, 705/35; 701/200, 206, 208, 202, 25, 28; 715/835, 853, 700, 760–764
See application file for complete search history.

(56) References Cited

U.S. PATENT DOCUMENTS

| | | | | |
|---|---|---|---|---|
| 4,870,576 A | * | 9/1989 | Tornetta | 705/1 |
| 5,032,989 A | | 7/1991 | Tornetta | 705/1 |
| 5,559,707 A | | 9/1996 | DeLorme et al. | 701/200 |
| 5,731,997 A | | 3/1998 | Manson et al. | 702/150 |
| 5,736,977 A | | 4/1998 | Hughes | |
| 5,781,773 A | | 7/1998 | Vanderpool et al. | 707/100 |
| 5,794,216 A | | 8/1998 | Brown | 705/27 |
| 5,852,810 A | | 12/1998 | Sotiroff et al. | 705/27 |
| 5,991,769 A | | 11/1999 | Fino et al. | 365/619 |
| 6,219,053 B1 | * | 4/2001 | Tachibana et al. | 345/835 |
| 6,748,318 B1 | * | 6/2004 | Jones | 701/201 |

OTHER PUBLICATIONS

Goldstein, et al. "Using Aggregation and Dynamic Queries for Exploring Large Data Sets", Proceedings of the SIGCHI Conference on Human Factors in Computing Systems: Celebrating Interdependence. pp. 23-29, 1994.
Roth, et al. "Interactive Graphic Design Using Automatic Presentation Knowledge", Proceedings of the CHI Conference. 1994. 7 pages.
Derthick, et al. "An Interactive Visual Query Environment for Exploring Data", Proceedings of the 10th annual ACM symposium on User interface Software and Technology. pp. 189-198, 1997.

(Continued)

*Primary Examiner* — Tadeese Hailu
(74) *Attorney, Agent, or Firm* — Turocy & Watson, LLP

(57) ABSTRACT

A computer system creates and displays a map image based upon a value database associating a plurality of values each with a geographic location in a geographic area and a map program associating each location with a map image location. The computer system assigns one of a plurality of symbols to each geographic location based upon its associated value. The symbol is then displayed on the map image at the map image location associated with the geographic location.

49 Claims, 3 Drawing Sheets

OTHER PUBLICATIONS

Mittal, et al. "Describing Complex Charts in Natural Language: A Caption Generation System"; Association for Computational Linguistics, 1998. 38 pages.

Robertson, et al. "Dual Device User Interface Design: PDAs and Interactive Television", Proceedings of the SIGCHI conference on Human factors in computing systems: common ground CHI '96. Apr. 1996. 8 pages.

Williamson, et al. "The Dynamic HomeFinder: Evaluating Dynamic Queries in a Real-Estate Information Exploration System", Proceedings of the 15th annual international ACM SIGIR conference on Research and development in information retrieval SIGIR '92. Jun. 1992. 9 pages.

Oviatt. "Multimodal Interfaces for Dynamic Interactive Maps", Proceedings of the SIGCHI conference on Human factors in computing systems: common ground CHI '96. Apr. 1996. 8 pages.

Ahlbelrg, et al. "Visual Information Seeking: Tight Coupling of Dynamic Query Filters with Starfield Displays", Proceedings of the SIGCHI conference on Human factors in computing systems: celebrating interdependence CHI '94 Apr. 1994. 7 pages.

\* cited by examiner

HOME VALUE MAP
BY SOUTHEASTERN APPRAISAL CORP.

IN ORDER TO DOWNLOAD THE MAPS, PLEASE CLICK ON THE LEFT HAND SIDE OF THE TABLES BELOW, FOR THE AREA YOU INTERESTED IN.

YOU MUST HAVE A COLOR PRINTER.
USE BEST PRINT QUALITY SELECTIONS.

SELECT YOUR MAPS:

| | OAKLAND COUNTY: | CITIES: |
|---|---|---|
| 100a | ADDISON | ADDISON |
| 100b | BIRMINGHAM | BIRMINGHAM |
| 100c | BLOOMFIELD HILLS | BLOOMFIELD HILLS |
| | COMMERCE TOWNSHIP | COMMERCE TOWNSHIP |
| | FARMINGTON HILLS | FARMINGTON HILLS, FARMINGTON |
| | GROVELAND | GROVELAND |
| | HIGHLAND | HIGHLAND |
| | HOLLY | HOLLY |
| | INDEPENDANCE TOWNSHIP | INDEPENDANCE TOWNSHIP |
| | SOUTH LYON | SOUTH LYON |
| | MILFORD | MILFORD |
| | NOVI | NOVI |
| | OAKLAND | OAKLAND |
| | ORION | ORION |
| | ORTONVILLE | ORTONVILLE |
| | OXFORD | OXFORD |
| | PONTIAC | PONTIAC |
| | ROCHESTER HILLS | ROCHESTER HILLS |
| | ROSEVILLE | ROSEVILLE |
| | ROYAL OAK | ROYAL OAK |
| | SPRINGFIELD | SPRINGFIELD |
| | SOUTHFIELD | SOUTHFIELD |
| | TROY | TROY |
| | WEST BLOOMFIELD | WEST BLOOMFIELD |
| | WATERFORD | WATERFORD |

Fig-3

REAL ESTATE VALUE MAP COMPUTER SYSTEM

This application is a Continuation in part of Ser. No. 09/286,922 filed Apr. 6, 1999, now U.S. Pat. No. 6,323,885, which claims priority to U.S. Provisional Patent Application Ser. No. 60/100,831, filed Sep. 18, 1998.

BACKGROUND OF THE INVENTION

The present invention relates generally to computer systems and more particularly to a computer system for creating and providing a map image of real estate values.

Currently, data indicating sale prices of homes or other real estate is available from several on-line sources. This data is typically displayed in text format, wherein each entry displays the address, sales price, sales date, etc. Although these databases provide information to potential home buyers regarding sale prices in selected areas, the textual display of such information is inefficient. Further, the textual display does not provide the observer with an indication of how sale prices vary generally across geographic areas.

SUMMARY OF THE INVENTION

The present invention provides a method and computer system for creating and displaying a map image including symbols which quickly and efficiently convey information regarding real estate values in numerous geographic locations in a selected geographic area simultaneously.

Preferably, the computer system of the present invention includes a database including a sale price for each of a plurality of real estate parcels in selected geographic areas. The computer system further includes a map program which associates each of the plurality of real estate parcels to a map image location. The computer system associates each of a plurality of symbols with a range of sales prices. Preferably each symbol includes a color and a shape. Each color is associated with a different range of sales prices. Each range is further divided in to subranges, with each shape within each color associated with one of the sub-ranges. Thus, the color of a symbol indicates the range of sales prices, while the shape further defines the sub-range of sales prices.

The computer associates one of the plurality of symbols with each of the real estate parcels based upon the sales price from the value database. Each symbol is then displayed on a map image based upon the association between the real estate parcel and the map image location.

The resulting map image of the geographic area includes the plurality of symbols displayed on the map image at locations corresponding to the real estate parcels. Each symbol indicates the sale price (within the sub-range) of the real estate parcel with which it is associated.

Since each range of real estate prices is associated with a color, an observer can quickly perceive larger variations in real estate values by observing differences in color between different geographic locations. By looking further, the observer can discriminate smaller variations in real estate values indicated by the different shapes of the symbols.

Preferably, the computer system is implemented on a network, such as the Internet. The computer system provides a user with the ability to select a geographic area. Upon selection of the geographic area, the computer system displays a map image with the symbols as described above for that area. Preferably, an advertisement associated with the selected geographic area is also displayed either alongside of the map image or in a display screen prior to the map image. The advertisement would ideally be for a realtor or mortgage broker or other service or product related to the purchase and sale of homes or other real estate.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which:

FIG. 3 illustrates a second display screen of the display of FIG. 1.

DETAILED DESCRIPTION OF THE PREFERRED EMBODIMENT

Figure 1:
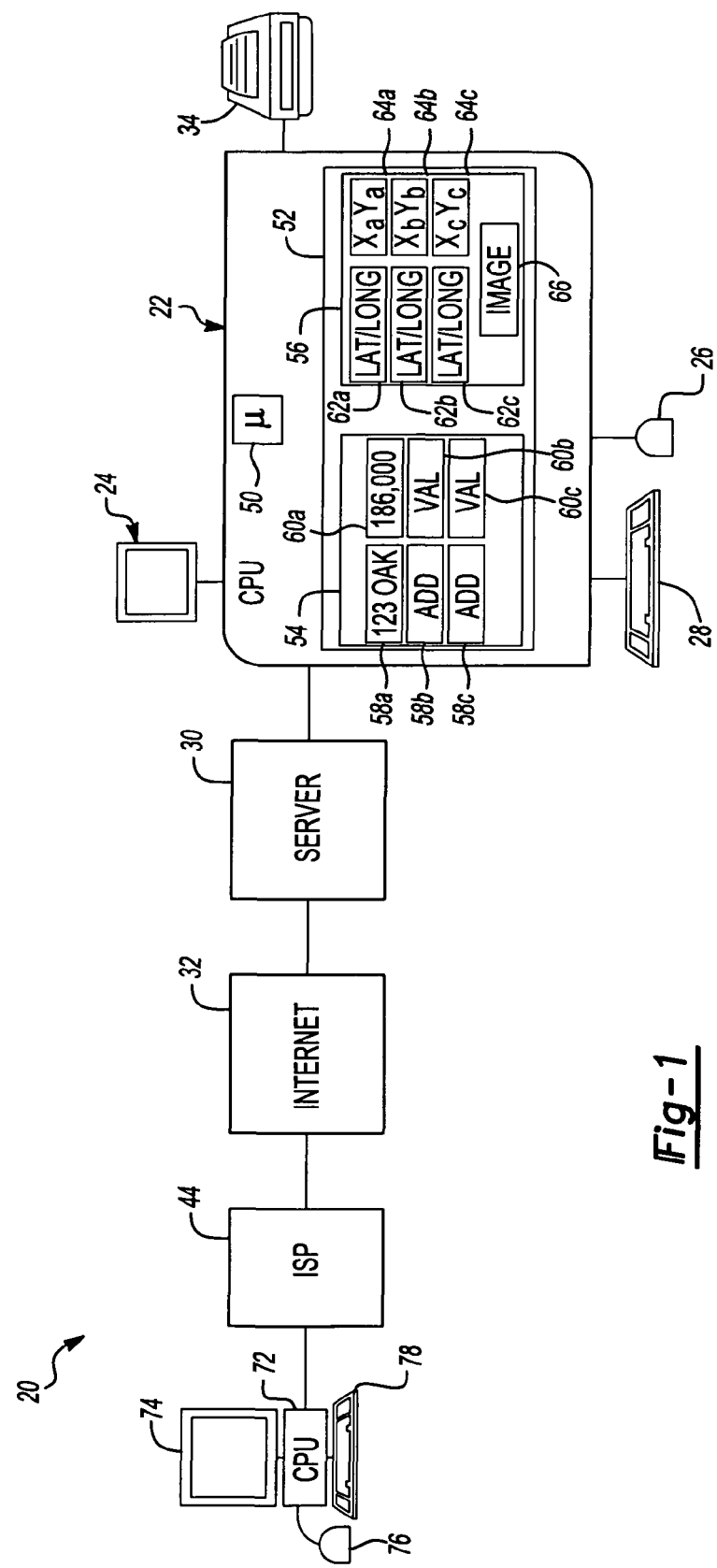
FIG. 1 is a schematic of the computer system of the present invention.

The present invention provides a computer system 20 for creating and providing a map image according to a method of the present invention. The computer system 20 includes first CPU 22 for creating the map image in a manner which will be discussed below. The first CPU 22 includes a display 24 and input devices, such as a mouse 26 and/or keyboard 28. The first CPU 22 may be connected to a server 30 capable of operating a web site on a network, such as the Internet 32. The first CPU 22 is also connected to a color printer 34. Alternatively, the first CPU 22 may comprise the server 30.

The first CPU 22 includes a microprocessor 50 accessing computer memory 52, such as a hard drive, RAM, CD ROM, ROM, etc. The computer memory 52 stores a value database 54 and a map program 56. The value database 54 associates each of a plurality of geographic locations 58*a-c* with each of a plurality of values 60*a-c*, respectively. The geographic locations 58 preferably comprise street addresses, real estate parcel identification numbers, tax identification numbers, latitude/longitude or other unique identifiers for the geographic locations. Each value 60 preferably comprises a number representing a sale price of the associated geographic location 58. Alternatively, each value 60 could represent an appraised price, rental value or other value associated with the geographic location 58.

The value database 54 is available from real estate listings, such as the Multiple Listing Services, local municipalities, TransAmerica or other sources. Generally, the map program 56 associates the geographic locations 58 with coordinates 64*a-c* on a digital street map image 66. There are many ways to implement the map program 56; however, suitable map programs 56 are available from Arcview with suitable databases and street map images 66 from ETAK or Geographic Data Technology. If the geographic location 58 is in the form of a street address, the map program 56 may first convert it to latitude/longitude information 62*a-c* in order to associate it with the street map image 66. Other known programs can directly associate street address information to coordinates on the street map image 66.

Information stored on the server 30 is available to users via the Internet 32 utilizing a CPU 72 including a display 74 and input devices, such as a mouse 76 and/or a keyboard 78. The microprocessor 50 of the first CPU 22 is programmed with suitable software to perform the functions described herein, as are the server 30, CPU 72 and ISP 44.

Figure 2:
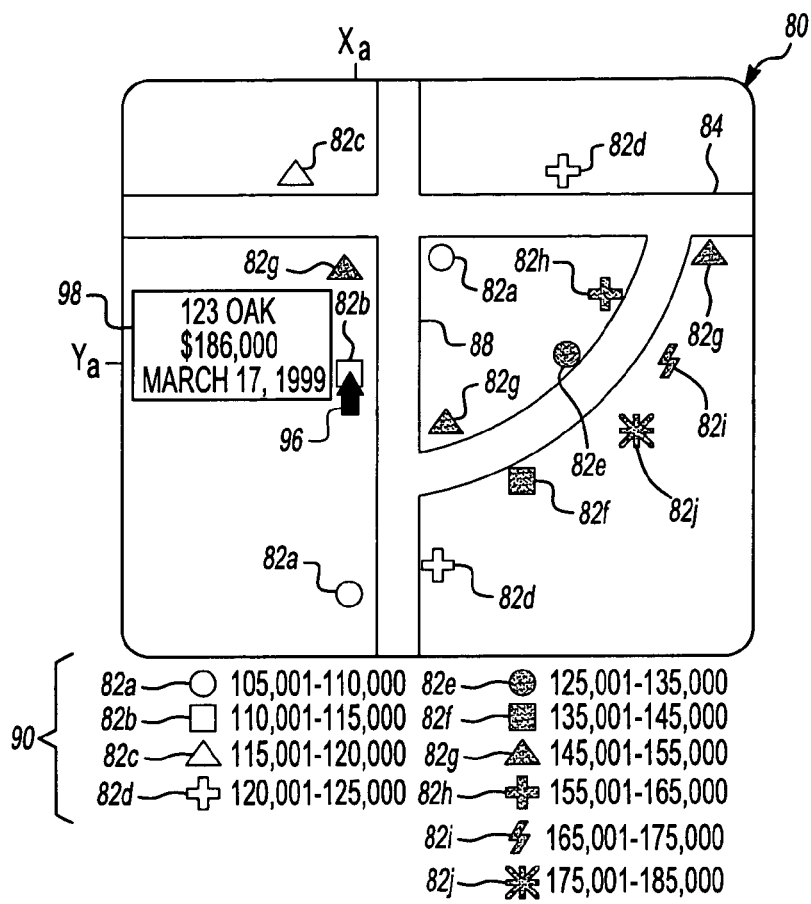
FIG. 2 illustrates a first display screen of the display of FIG. 1.

The first CPU 22 is programmed to create a map image 80 shown in FIG. 2. The map image 80 includes a plurality of symbols 82*a-h* displayed around a plurality of streets 84, 86 and 88 from the digital street map image 66 (FIG. 1). Each of the symbols 82 is associated with a sub-range of values. The location of the symbol 82 on the map image 80 corresponds to a geographic location. The symbol 82 displayed indicates the value of the geographic location at which the symbol 82 is displayed. A legend 90 is preferably displayed adjacent the map image 80. As can be seen in FIG. 2, the symbols 82 include a plurality of shapes, each displayed in one of a plurality of colors. Although only four shapes and two colors are shown in FIG. 2, preferably at least eight shapes and at least five colors are utilized. Colors and shapes could be constant across all geographic areas or alternatively, colors and shapes could be assigned to ranges and subranges based upon the range of values in the geographic area. The size of each range and subrange could also vary based upon the values in the geographic area displayed. One of reasonable skill in the art and familiar with computers could select appropriate colors.

Each color is associated with a range of values. For example, in FIG. 2, the white symbols 82*a-d* are associated with values between $170,001 to $210,000 and the black symbols 82*e-h* are associated with the values of $210,001 and above. Within each color, the ranges of value are broken into sub-ranges, each associated with a shape. For example, the white circle symbol 82*a* is associated with values between $170,001 to $180,000, the white square symbol 82*b* is associated with values from $180,001 to $190,000 and so on as shown in the legend 90 of FIG. 2.

Thus, an observer of the map image 80 of FIG. 2 quickly and efficiently ascertains general trends in values based upon colors in certain areas on the map image 80, which includes a certain geographic area. After discerning general trends (if any) between geographic location and values, a user can discern values more specifically, i.e., into the sub-ranges, by observing the specific shapes of the symbols 82 within each color.

It should be noted that the map image 80 (and legend 90) could be displayed on a computer display, such as the computer displays 24, 74 of FIG. 1 or printed on paper, such as by the printer 34 of FIG. 1. If the map image 80 is displayed on a computer display, a user could select additional information about any of the geographic locations associated with a symbol 82. For example, by moving a cursor 96 over the symbol 82*b*, a pop-up display 98 appears adjacent the symbol 82*b*, indicating additional information regarding the geographic location associated with symbol 82*b*, such as street address, exact value and/or date of the sale. Although a very small geographic area is shown in map image 80 of FIG. 2, preferably, the user can selectively change the scale of the map image 80 and select different geographic areas in a manner similar to known computer map display programs.

The map image 80 of FIG. 2 is created by the first CPU 22 of FIG. 1. The method of creating the map image 80 of the present invention will be described with respect to FIGS. 1 and 2. The first CPU 22 associates each of the plurality of symbols 82*a-h* with a sub-range of values, associating each color with a range and each shape within each color with a sub-range, generally as shown in the legend 90 of FIG. 2.

Although each of the sub-ranges could be equal, the sub-ranges of the symbols at the higher value colors are preferably larger. As shown in FIG. 2, the symbols 82*a-d* for a first color each cover a $5,000 sub-range, while the symbols 82*e-j* for a second color each cover a $10,000 sub-range. Additionally, or alternatively, there could be a greater number of symbols for the higher value colors than the lower value colors. As shown in FIG. 2, the second color (range) includes more symbols 82*e-82j* than the first color (range). Again, the number of symbols or the size of the sub-ranges can each be varied, or both.

The CPU 22 then reads the value database 54 and associates one of the plurality of symbols 82 with each street address 58 in the value database 54. Each symbol 82 may be used for more than one coordinate 64, as more than one real estate parcel falls within the associated sub-range.

The map program 56 and the CPU 22 then convert or correlate the street addresses 58 to latitude/longitude information 62. The latitude/longitude information 62 is then converted or correlated to coordinates 64 on the computer street image 66. Alternatively, the CPU 22 and map program 56 may directly convert or correlate the street addresses 58 to the coordinates 64. Alternatively, the geographic locations 58 may be latitude/longitude information 62.

Thus, street address 58*a* is associated with value 60*a*, latitude/longitude information 62*a* and coordinate 64*a*. Likewise, street address 58*b*, value 60*b*, latitude/longitude information 62*b* and coordinates 64*b* are also associated, and so on. The CPU 22 then generates the map image 80, displaying the street image 66 with the symbols 82 displayed at their associated coordinates 64 on the street image 66, as shown in FIG. 2.

For example, street address 58*a* ("123 Oak") is associated with a value 60*a* of $186,000. Thus, CPU 22 associates symbol 82*b* ($180,001-190,000) with street address 58*a*. CPU 22 also determines that symbol 82*b* should be displayed at coordinates $x_a, y_b$. This is demonstrated in FIGS. 1 and 2. Coordinates $x_a, y_b$ on street image 66 correspond to the proper geographic location on the map image 80 relative to the streets 84, 86, 88.

Figure 4:
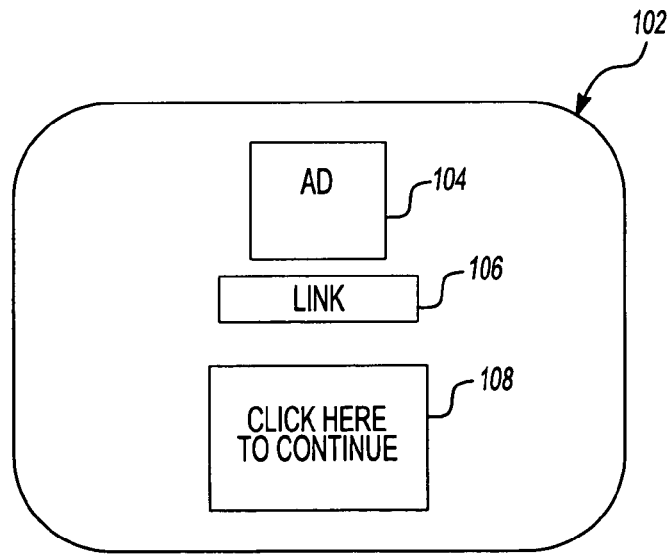
FIG. 4 illustrates a third display screen of the display of FIG. 1.

When a user accesses the server 30 of Internet 32, the user of CPU 72 is first presented with one or more geographic area selection screens, such as shown in FIG. 3, on display 74. The geographic area selection screen displays a plurality of geographic areas 100*a-c*, each associated with a map image, including map image 80 of FIG. 2. Upon selection of a geographic area 100 from the display in FIG. 3, an advertisement screen 102, such as that shown in FIG. 4, is preferably displayed on the user's display 74. The advertisement screen 102 includes an ad 104 and/or Internet link 106. Preferably, the ad 104 and/or link 106 is for a product and/or service related to the associated geographic area 100 (FIG. 3). Most preferably, the ad 104 and/or link 106 is also related to the purchase, sale or ownership of real estate, such as realtors, mortgage brokers, etc. The ad screen also includes a link 108 to the map image screen shown in FIG. 2. Alternatively, the user could enter a starting address on the user's CPU 22 to select a geographic area in a manner similar to known computer map and driving instruction programs.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of displaying on a computer information regarding values associated with a plurality of geographic locations including the steps of:

a) receiving a request for information regarding a first geographic area including the plurality of geographic locations, wherein the plurality of geographic locations are street addresses;

b) receiving a plurality of values each associated with one of the plurality of geographic locations, wherein said plurality of values are price values;
c) associating each of a plurality of symbols with each of the plurality of geographic locations based upon the associated value of said each of the plurality of geographic locations, wherein the plurality of symbols each include a different shape;
d) displaying a map of the first geographic area in response to said step a) on a display; and
e) displaying each of the plurality of symbols on the map at its associated geographic location in response to said step a) on the display.

2. The method of claim 1 wherein the plurality of symbols each include a different color.

3. A method of displaying on a computer information regarding values associated with a plurality of geographic locations including the steps of:
a) receiving a request for information regarding a first geographic area including the plurality of geographic locations, wherein the plurality of geographic locations are street addresses;
b) receiving a plurality of values each associated with one of the plurality of geographic locations, wherein said plurality of values are price values;
c) associating each of a plurality of symbols with each of the plurality of geographic locations based upon the associated value of said each of the plurality of geographic locations;
d) displaying a map of the first geographic area in response to said step a) on a display; and
e) displaying each of the plurality of symbols on the map at its associated geographic location in response to said step a) on the display;
f) associating each of the plurality of symbols with a different range of values wherein each of the plurality of symbols has first visually identifying characteristic indicating one of a plurality of ranges of the values and a second visually identifying characteristic indicating a subrange within its associated range; and
g) associating each of the plurality of symbols based upon said steps c) and f) wherein the value of each geographic location corresponds to the range and subrange indicated by the symbol associated with the geographic location.

4. The method of claim 3 wherein each of the symbols has an associated color and an associated shape.

5. The method of claim 4 wherein a magnitude of the ranges vary among the plurality of symbols.

6. The method of claim 4, wherein the associating the plurality of non-alphanumeric graphical symbols further includes assigning the plurality of non-alphanumeric graphical symbols to at least two street addresses of the plurality of street addresses based upon price values of the plurality of price values associated with the at least two street addresses.

7. A method of displaying on a computer information regarding values associated with a plurality of geographic locations including the steps of:
a) receiving a request for information regarding a first geographic area including the plurality of geographic locations, wherein the plurality of geographic locations are street addresses;
b) receiving a plurality of values each associated with one of the plurality of geographic locations, wherein said plurality of values are price values;
c) associating each of a plurality of symbols with each of the plurality of geographic locations based upon the associated value of said each of the plurality of geographic locations;
d) displaying a map of the first geographic area in response to said step a) on a display; and
e) displaying each of the plurality of symbols on the map at its associated geographic location in response to said step a) on the display;
f) associating each of a plurality of colors with one of a plurality of ranges of the values;
g) associating each of a plurality of shapes with one of a plurality of subranges within each of the plurality of ranges of the values, each symbol including one of the plurality of colors and one of the plurality of shapes, wherein a magnitude of the plurality of subranges varies among the symbols; and
h) associating each of the plurality of symbols based upon said steps c), f) and g).

8. The method of claim 7 wherein the subranges for symbols associated with a higher-value color are larger in magnitude than symbols associated with a lower-value color.

9. A computer system for displaying information regarding values associated with a plurality of locations comprising:
a) an input device for selectively generating a request for information regarding a geographic area;
b) a database of a plurality of values each associated with one of the plurality of locations in the geographic area, each of a plurality of symbols associated with each of the plurality of locations based upon the values, wherein the plurality of symbols each include a different shape and a different color and wherein said plurality of values are price values and said plurality of locations are street addresses; and
c) a display displaying a map of the first geographic area and each of the plurality of values at the associated locations on the map in response to said request from said input device.

10. The computer system of claim 9 wherein each of a plurality of colors is associated with one of a plurality of ranges of the values, and each symbol includes a different one of the plurality of colors, each of the plurality of symbols associated with the plurality of locations based upon the associated colors and values.

11. A computer system for creating a map comprising:
a map program associating each of a plurality of geographic locations in a geographic area with a map location, wherein said geographic locations are street addresses;
a value database of a plurality of values each associated with one of the plurality of geographic locations, wherein said plurality of values are price values;
a plurality of symbols, each associated with at least one of the plurality of values wherein each of the plurality of symbols has a first visually identifying characteristic indicating one of a plurality of ranges of the values and a second visually identifying characteristic indicating a subrange within its associated range;
a computer programmed to associate each of the plurality of symbols with each of the plurality of map locations in the map program based upon the associated value in the value database for the associated geographic location; and
a display displaying a map image of the geographic area and each of the plurality of symbols at the associated map locations.

12. The computer system of claim 11 wherein each of a plurality of colors is associated with one of a plurality of ranges of the values, and each symbol includes a different one of the plurality of colors, each of the plurality of symbols associated with the plurality of locations based upon the associated colors and values.

13. The computer system of claim 11 wherein each of the plurality of symbols is different in appearance.

14. The computer system of claim 13 wherein said each of the plurality of symbols is associated with more than one of the plurality of locations based upon the associated values.

15. A method for creating a map image in a computer including the steps of:
   a) receiving a plurality of values each associated with one of a plurality of geographic locations in a geographic area, wherein said plurality of values are price values and said plurality of geographic locations are street addresses;
   b) associating each of a plurality of symbols with at least one of the plurality of values wherein each of the plurality of symbols has a first visually identifying characteristic indicating one of a plurality of ranges of the values and a second visually identifying characteristic indicating a subrange within its associated range;
   c) associating each of the plurality of geographic locations with a map location on a street map image;
   d) associating each of the plurality of symbols with each of the plurality of map locations based upon the associated values;
   e) generating the map image of the geographic area including the plurality of symbols each at their associated map locations.

16. The method of claim 15 further including the steps of:
   f) receiving a request for information regarding the geographic area;
   g) displaying a map of the first geographic area in response to said step a); and
   h) displaying each of the plurality of symbols on the map at its associated location in response to said step a).

17. The method of claim 15 wherein said steps c) and d) are performed after said steps a) and b).

18. The method of claim 15 further including the steps of:
   f) associating each of a plurality of shapes with one of a plurality of ranges of the values, each symbol including a different one of the plurality of shapes;
   g) associating each of the plurality of symbols based upon said step f).

19. The method of claim 18 further including the step of: displaying a legend indicating the values associated with each of the plurality of symbols.

20. The method of claim 15 wherein each of the plurality of values is associated with a street address.

21. A method of displaying on a computer information regarding values associated with a plurality of geographic locations including the steps of:
   a) associating each of a plurality of symbols with one of a plurality of geographic locations based upon associated values of the geographic locations, each of the plurality of symbols having first visually identifying characteristic indicating one of a plurality of ranges of the values and a second visually identifying characteristic indicating a subrange within its associated range, the value of each geographic location corresponding to the range and subrange indicated by the symbol associated with the each geographic location;
   b) receiving a request for information regarding a first geographic area including the plurality of geographic locations;
   c) displaying a map of the first geographic area in response to said step b);
   d) displaying each of the plurality of symbols on the map at its associated geographic location in response to said step b).

22. The method of claim 21 wherein one of the first visually identifying characteristic and the second visually identifying characteristic is shape.

23. The method of claim 22 wherein the other of the first visually identifying characteristic and the second visually identifying characteristic is color.

24. The method of claim 21 wherein at least one of the first visually identifying characteristic and the second visually identifying characteristic is color.

25. The method of claim 21, wherein a magnitude of the subranges varies among the symbols.

26. A method for creating a map image in a computer including the steps of:
   a) receiving a plurality of values each associated with one of a plurality of geographic locations in a geographic area;
   b) associating each of a plurality of symbols with one of the plurality of geographic locations based upon the value associated with the geographic location;
   c) associating each of the plurality of geographic locations with a map location on a street map image;
   d) associating each of the plurality of symbols with each of the plurality of map locations based upon the associated values; and
   e) generating the map image of the geographic area including the plurality of symbols each at their associated map location, each of the plurality of symbols having first visually identifying characteristic indicating one of a plurality of ranges of the values and a second visually identifying characteristic indicating a subrange within its associated range, the value of each geographic location corresponding to the range and subrange indicated by the symbol associated with the geographic location.

27. The method of claim 26 wherein at least one of the first visually identifying characteristic and the second visually identifying characteristic is shape.

28. The method of claim 27 wherein at least one of the first visually identifying characteristic and the second visually identifying characteristic is color.

29. The method of claim 26 wherein at least one of the first visually identifying characteristic and the second visually identifying characteristic is color.

30. The method of claim 26, wherein a magnitude of the subranges varies among the symbols.

31. A method comprising:
   receiving a request for information regarding a first geographic area including a plurality of street addresses;
   receiving a plurality of price values associated with the plurality of street addresses;
   associating a plurality of non-alphanumeric graphical symbols with the plurality of street addresses based upon the plurality of price values of the plurality of street addresses; and
   displaying, on a display of a computing device, a map including at least a portion of the first geographic area in response to the receiving of the request,
   wherein displaying the map includes displaying at least one of the plurality of non-alphanumeric graphical symbols at or near at least one map location corresponding to at least one street address of the plurality of street addresses.

32. The method of claim 31, wherein the receiving the plurality of price values and the associating are performed prior to the receiving the request.

33. The method of claim 31, wherein the receiving the plurality of price values includes receiving a plurality of rental values.

34. The method of claim 31, further comprising:
displaying a list of a plurality of geographic areas, including the first geographic area prior to the receiving the request.

35. The method of claim 31, further comprising:
displaying a legend indicating the plurality of price values associated with the plurality of non-alphanumeric graphical symbols.

36. The method of claim 31, further comprising:
displaying an advertisement based upon the receiving the request, wherein the advertisement is for an entity, product, or service, excluding real estate located at one of the plurality of street addresses.

37. The method of claim 31, further comprising at least one of receiving a request for additional information for a selected one of the plurality of street addresses or displaying supplemental information for a selected one of the plurality of street addresses.

38. The method of claim 31, further comprising:
associating a price value of the plurality of price values with a latitude and longitude; and
displaying at least one of the plurality of non-alphanumeric graphical symbols at or near at least one map location corresponding to the latitude and longitude.

39. The method of claim 31, wherein the displaying the at least one of the plurality of non-alphanumeric graphical symbols includes displaying a first non-alphanumeric graphical symbol and a second non-alphanumeric graphical symbol different in appearance from the first non-alphanumeric graphical symbol.

40. A computer system comprising:
an input device for selectively generating a request for information regarding a geographic area;
a database of a plurality of price values associated with a plurality of street addresses in the geographic area, wherein the plurality of price values are further associated with a plurality of non-alphanumeric graphical symbols based upon the plurality of price values; and
a display configured to display a map of at least a portion of the geographic area and at least one of the plurality of non-alphanumeric graphical symbols at or near street addresses of the plurality of street addresses represented on the map in response to the request.

41. The computer system of claim 40, wherein the plurality of price values are a plurality of rental price values.

42. The computer system of claim 40, wherein the display is further configured to display a plurality of geographic areas facilitating input device selection of the geographic area from the plurality of geographic areas.

43. The computer system of claim 40, wherein a first non-alphanumeric graphical symbol of the plurality of non-alphanumeric graphical symbols is different in appearance from at least a second non-alphanumeric graphical symbol of the plurality of non-alphanumeric graphical symbols.

44. The computer system of claim 43, wherein at least one of the non-alphanumeric graphical symbols of the plurality of non-alphanumeric graphical symbols is associated with at least two street addresses of the plurality of street addresses based, at least in part, upon a price value of the plurality of price values associated with the at least two street addresses of the plurality of street addresses.

45. An article of manufacture including a computer-readable medium having instructions stored thereon that, in response to execution by a computing device, cause the computing device to perform a method, comprising:
receiving a request for information regarding a first geographic area including a plurality of real estate parcels;
receiving a plurality of price values associated with the plurality of real estate parcels;
associating a plurality of purely graphical symbols with the plurality of real estate parcels based, at least in part, on a subset of price values of the plurality of price values associated with the plurality of real estate parcels; and
displaying, on a display of a computing device, a map including at least a portion of the first geographic area in response to the receiving of the request,
wherein the displaying the map includes displaying at least one of the plurality of purely graphical symbols at or near at least one map location corresponding to at least one real estate parcel of the plurality of real estate parcels.

46. The article of manufacture of claim 45, wherein the method further comprises:
displaying a list of a plurality of geographic areas, including the first geographic area, prior to the receiving the request for information.

47. The article of manufacture of claim 45, wherein the method further comprises:
displaying an advertisement based upon the receiving the request, wherein the advertisement is for an entity, product, or service, excluding real estate located at one of the plurality of real estate parcels.

48. The article of manufacture of claim 45, wherein a first purely graphical symbol of the plurality of purely graphical symbols is different in appearance from at least a second purely graphical symbol of the plurality of purely graphical symbols.

49. The article of manufacture of claim 48, wherein at least one of the purely graphical symbols of the plurality of purely graphical symbols is associated with more than one real estate parcel of the plurality of real estate parcels based, at least in part, upon a price value of the plurality of price values associated with the more than one real estate parcel of the plurality of real estate parcels.

* * * * *

UNITED STATES PATENT AND TRADEMARK OFFICE
CERTIFICATE OF CORRECTION

| | | |
|---|---|---|
| PATENT NO. | : 8,046,715 B2 | |
| APPLICATION NO. | : 10/044583 | |
| DATED | : October 25, 2011 | |
| INVENTOR(S) | : Wiese | |

It is certified that error appears in the above-identified patent and that said Letters Patent is hereby corrected as shown below:

Column 1, line 3, below "Title" insert -- CROSS-REFERENCE TO RELATED APPLICATIONS --.

Signed and Sealed this
Eighth Day of May, 2012

David J. Kappos
*Director of the United States Patent and Trademark Office*